United States Patent [19]

Schepps et al.

[11] Patent Number: 5,883,592

[45] Date of Patent: *Mar. 16, 1999

[54] METHOD AND APPARATUS FOR REMOTELY IDENTIFYING AN ELECTRONICALLY CODED ARTICLE

[75] Inventors: Jonathan Lloyd Schepps, Princeton Jct.; Henry Charles Johnson, East Windsor; Min-Long Lin, Princeton, all of N.J.

[73] Assignee: Sarnoff Corporation Secom, Princeton, N.J.

[21] Appl. No.: 987,809

[22] Filed: Dec. 10, 1997

Related U.S. Application Data

[60] Provisional application No. 60/052,135 Jul. 10, 1997.

[51] Int. Cl.[6] .................................................... H04Q 7/00
[52] U.S. Cl. ............................................................ 342/44
[58] Field of Search .................. 342/44, 42; 340/825.54, 340/825.34

[56] References Cited

U.S. PATENT DOCUMENTS 4,691,202  9/1987  Denne et al. ....................... 340/825.34
5,491,482  2/1996  Dingwall et al. .......................... 342/42
5,502,445  3/1996  Dingwall et al. .......................... 342/51

FOREIGN PATENT DOCUMENTS 0 324 564 B1  7/1989  European Pat. Off. .

*Primary Examiner*—Daniel T. Pihulic
*Attorney, Agent, or Firm*—William J. Burke

[57] ABSTRACT

Apparatus, and a concomitant method of operation for the apparatus, for responding to an interrogation signal transmitted by a remotely located interrogator comprising: a demodulator for demodulating the interrogation signal; a signal processor, coupled to the demodulator, for interpreting a set up instruction contained in the interrogation signal and for initiating a counter to count cycles of a carrier wave signal contained in the interrogation signal; and a modulator, coupled to the signal processor, for transmitting a pulse when the signal processor indicates that the counter has attained a count value that matches a codeword stored in the signal processor.

13 Claims, 4 Drawing Sheets

METHOD AND APPARATUS FOR REMOTELY IDENTIFYING AN ELECTRONICALLY CODED ARTICLE

This application claims benefit of U.S. provisional patent application Ser. No. 60/052,135, filed Jul. 10, 1997.

This invention relates to systems remotely identifying electronically coded articles, e.g., tags or badges. More particularly, the invention provides an ability to rapidly identify a coded article, even when multiple articles are simultaneously present in an interrogation area.

BACKGROUND OF THE INVENTION

Commonly assigned U.S. Pat. No. 5,502,445, issued Mar. 26, 1996 and 5,491,482, issued Feb. 13, 1996 disclose a system and method for remotely identifying electronically coded articles (e.g., tags, badges and the like). Each of these patents is herein incorporated by reference. The interrogation and identification (I/I) system is comprised of an interrogator/reader (I/R) unit (also referred to as simply an interrogator) and a plurality of badges. The interrogator sends a microwave signal to the badges within a defined area near the interrogator, i.e., the interrogation area. Circuitry within each of the badges processes the interrogation signal and, in response to the interrogation signal, the badges transmit a signal back to the interrogator. From the responsive signal, the interrogator identifies each of the badges by analyzing certain modulation encoded onto the return signal.

More specifically, each of the badges contains a plurality of ID registers (e.g., an A-register, a B-register, and so on) that store unique identification values, i.e., although a particular value in a particular register is not unique, the values in a plurality of registers taken together uniquely identify the badge. The interrogator causes each badge to retrieve the identification values and send the values to the interrogator. To accomplish badge identification, the system performs a "two pass" process. During the first pass, the system generates an interrogation beam to activate the badges within the interrogation area. The system repeatedly sends an interrogation signal that causes the badges to transmit values from their ID registers. This pass causes all the values from each register to be sent, i.e., request the data in all the A-registers of all the badges within the interrogation area, then request data from all the B-registers, then all the C-registers, and so on. The identification values are stored in a computer coupled to the interrogator. The computer then categorizes the values into groups defined by the specific register within the badge from which the value was retrieved, i.e., each returned value is stored in an array that correlates the various values with the various registers. During a "second pass", the categorized groups are sorted by sending particular coding combination to the badges where the coding combination is derived from an analysis of the categorized values. The specific coding combinations uniquely identify the badge that responds to the second interrogation signal.

To accumulate the data from the ID registers, the present system repeatedly polls the badges that are within in the interrogation area to retrieve the register data one register at a time, i.e., all the A-registers are polled, then all the B-registers, and so on. This one-value at a time process is relatively slow.

Therefore, there is a need in the art for a system and method for rapidly identifying a plurality of electronically coded badges.

SUMMARY OF THE INVENTION

The present invention overcomes the disadvantages heretofore associated with the prior art by providing an improved transceiver badge that substantially improves the speed of a remote identification system. Specifically, the invention is a system, and a concomitant method of operation for the system, comprising a electronically coded article (e.g., a badge, tag, and the like), an interrogator, and a computer. The interrogator transmits predefined commands using a microwave signal, i.e., the interrogator transmits an interrogation signal. The badge interprets the commands and transmits a responsive signal. The computer then processes the returned data to identify the badge.

More specifically, the badge contains a demodulator, a signal processor and a modulator, where the demodulator and modulator are coupled to a common antenna for receiving interrogation signals from an interrogator. The demodulator is capable of demodulating the interrogation signal and providing an encoded instruction to the signal processor. The signal processor contains a counter, an instruction decoder, a comparator and a plurality of ID registers containing codewords that uniquely identify the badge. Although many instructions are decoded by the instruction decoder, the instruction of interest is the instruction that "sets up" the signal processor components for responding to the interrogation signal. When the unique set up instruction is received, the instruction decoder resets the counter to zero, selects a particular ID register, and enables the comparator to compare the counter's count value to the selected ID register content. After the set up instruction is sent by the interrogator, the interrogator transmits a carrier wave (CW) signal that is demodulated by the demodulator and produced as a square wave signal having the same frequency as the CW signal. The square wave signal is divided by N and used to clock the counter. Thus the counter increments on every Nth count. Similarly, the interrogator, which is providing the CW signal, contains a similar circuit that increments on every Nth count of transmitted CW cycles. As such, the badge counter and interrogator counter are synchronized.

At each count of the counter, the badge's counter value is compared to the selected ID register value (codeword). When a match occurs, the comparator enables the modulator for the duration of the clock period and the modulator sends a pulse to the interrogator. When the interrogator detects this modulation signal, it stores its internal count value (which is the same as the current badge count value) in memory. This process is repeated for each ID register until they have all been polled.

The computer then correlates the received ID register values of all the badges that responded to the interrogation signal with the specific registers that were polled. From that information, the interrogator can perform a second scan of the badges to uniquely identify each badge. The second scan process is disclosed in detail in U.S. Pat. No. 5,502,445.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
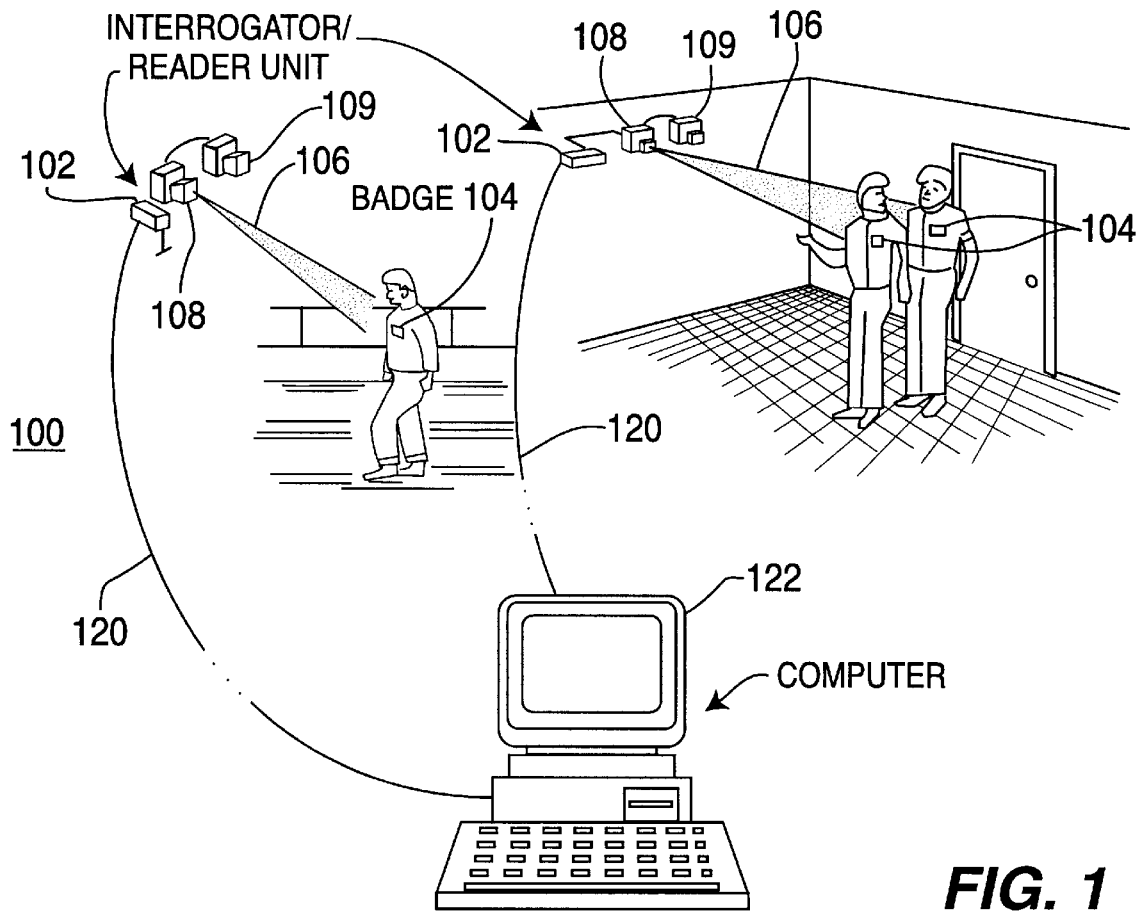
FIG. 1 is an illustrative schematic diagram of a remote identification system that utilizes the transceiver badge of the present invention.

FIG. 1 depicts a schematic illustration of an electronic interrogation and identification (I/I) system 100 that comprises one or more interrogator/reader (I/R) units 102, one or more badges (tags) 104, respective transmit and receive antennas 108 and 109, and a central computer 122. The I/R units operate at a suitable radio frequency or microwave frequency (e.g., 13.56 MHz) and transmit microwave (radio frequency) beams 106. The badges 104 (which uniquely identify individual employees) are interrogated by the beams 106 transmitted from the directional antenna 108 of the I/R units 102 positioned at selected locations. Each I/R unit 102, in addition, has a receiving antenna 109 which is closely similar to the transmitting antenna 108. The I/R units 102 are connected via respective cables 120 to a computer 122. In the course of being interrogated via a microwave beam 106 from an I/R unit 102, a badge or badges 104 reply electronically by transmitting a modulated signal back to the receiving antenna 109 of the I/R unit 102. The modulated signal contains various identification values that are stored in each badge. The badges 104 thus uniquely identify themselves in accordance with their respectively coded, electronically stored ID numbers. As will be explained below, each badge may be coded with any one of $2^{N \times B}$ different numbers, where N is the number of ID data registers and B is the number of bits per register. As soon as a badge has been identified, its electronic circuit is placed in an inactive or "power down" mode such that the badge does not continue to respond to the I/R unit 102 for so long as that badge (once it has been identified) remains within the range of the beam 106.

Figure 2:
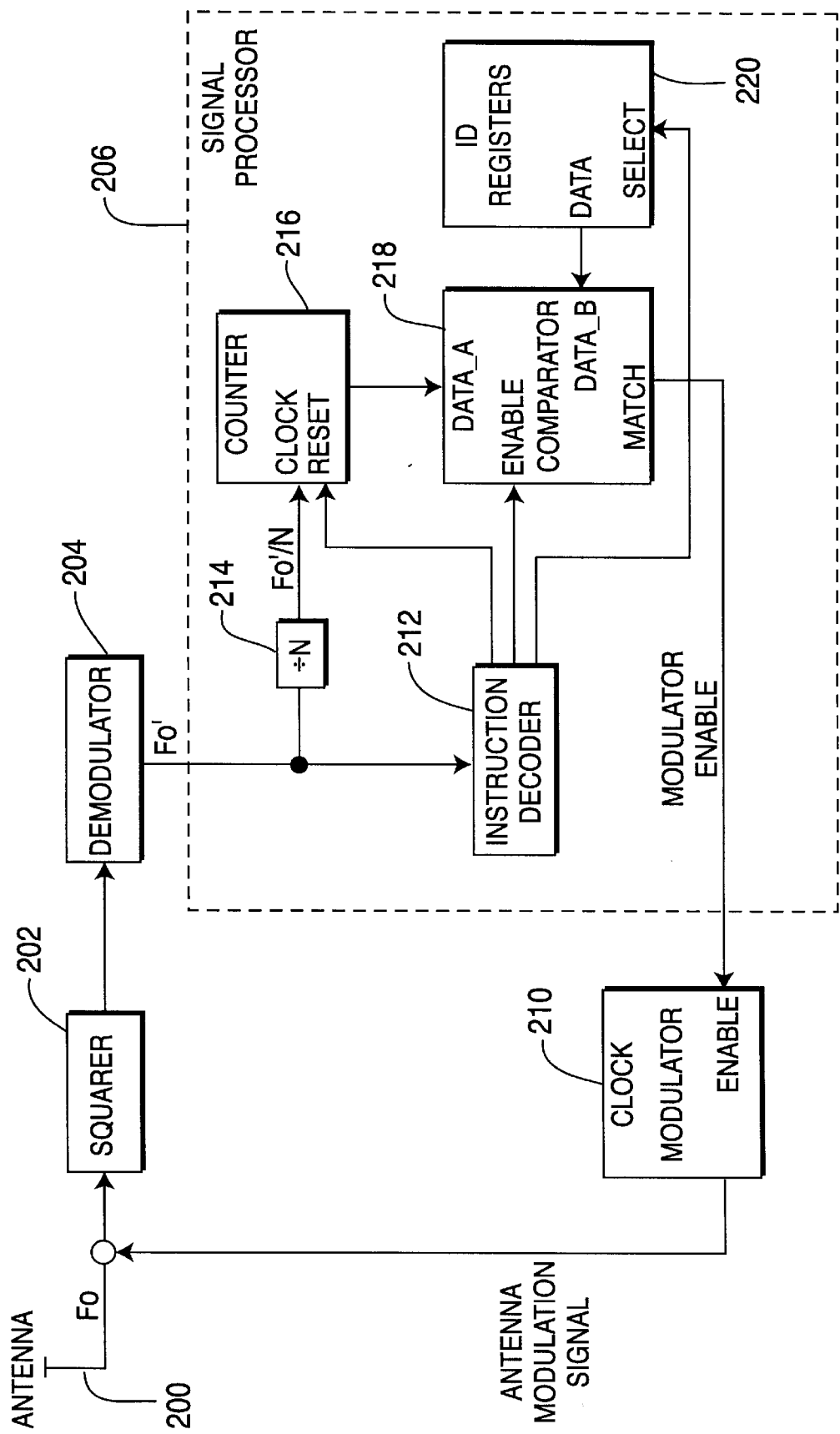
FIG. 2 is a block diagram of the transceiver badge of the present invention.

FIG. 2 depicts a block diagram of the transceiver badge 104 of the present invention. The transceiver badge 104 contains an antenna 200, a squarer 202, a demodulator 204, a signal processor 206 and a modulator 210. The antenna 200 receives an interrogation signal transmitted by the I/R unit. The antenna 200 is coupled to squarer 202 within which the interrogation signal is converted into a logic level signal. The logic level signal is coupled to the demodulator 204 which extracts binary encoded commands or data from the received signals. The demodulator is coupled to the signal processor 206. The signal processor 206 processes the demodulated signals to decipher any particular instructions contained in the received interrogation signal. The signal processor 206 also produces a responsive signal (e.g., modulator enable signal) in response to the decoded information in the interrogation signal. The responsive signal is coupled to the modulator 210. The modulator 210 is coupled to the antenna 200 for transmitting a responsive signal to the I/R unit.

More specifically, the signal processor contains an instruction decoder 212, a frequency divider 214, a counter 216, a comparator 218, and a plurality of ID registers 220 containing codewords that uniquely identify the badge. The demodulator 204 is coupled to the instruction decoder 212. The instruction decoder 212 sends control signals to other devices, such as the counter 216, the comparator 218 and the ID registers 220, based on commands received from demodulator 204. A comprehensive list of instructions that are processed by the instruction decoder are provided in U.S. Pat. No. 5,491,482.

The frequency divider 214 divides demodulated signals by N before they are received by counter 216. The counter 216 is capable of counting each Nth cycle and can be reset by the instruction decoder 212 to a count of zero. The comparator 218 can compare the counter value (DATA-A) to the contents (DATA-B) of any one of the data registers in ID registers 220 based on control logic from instruction decoder 212. ID registers 220 are data storage registers that contain the identification code, e.g., a 32-bit code can be stored in four 8-bit codeword registers. In response to a modulator enable signal produced by the comparator 218, modulator 210 applies a modulated signal to antenna 200 that is transmitted to the I/R unit.

Figure 5:
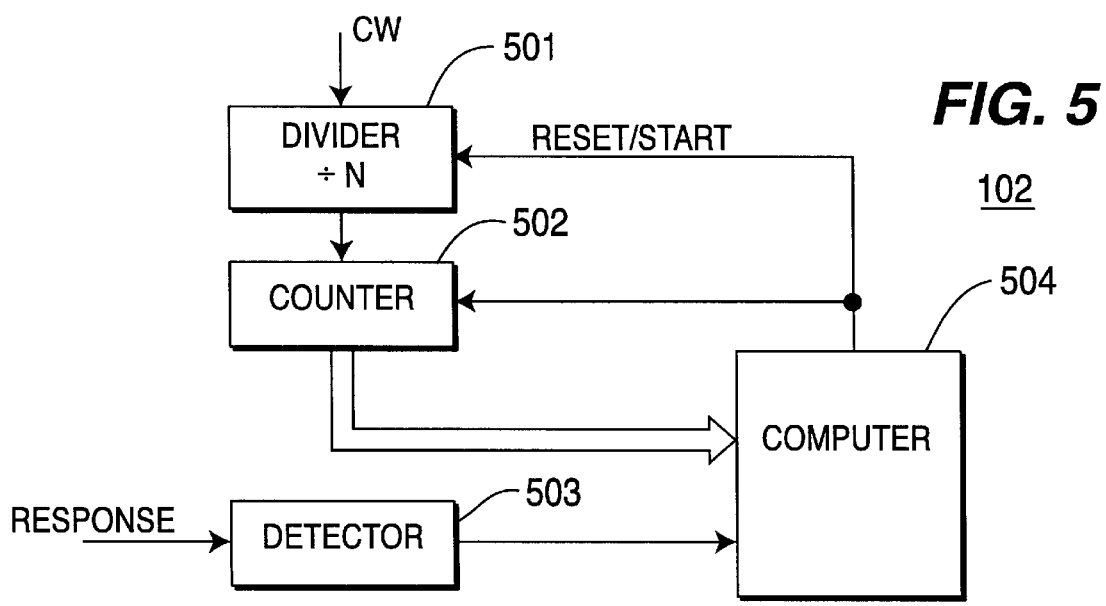
FIG. 5 is a block diagram of an interrogator of the present invention.
Figure 3:
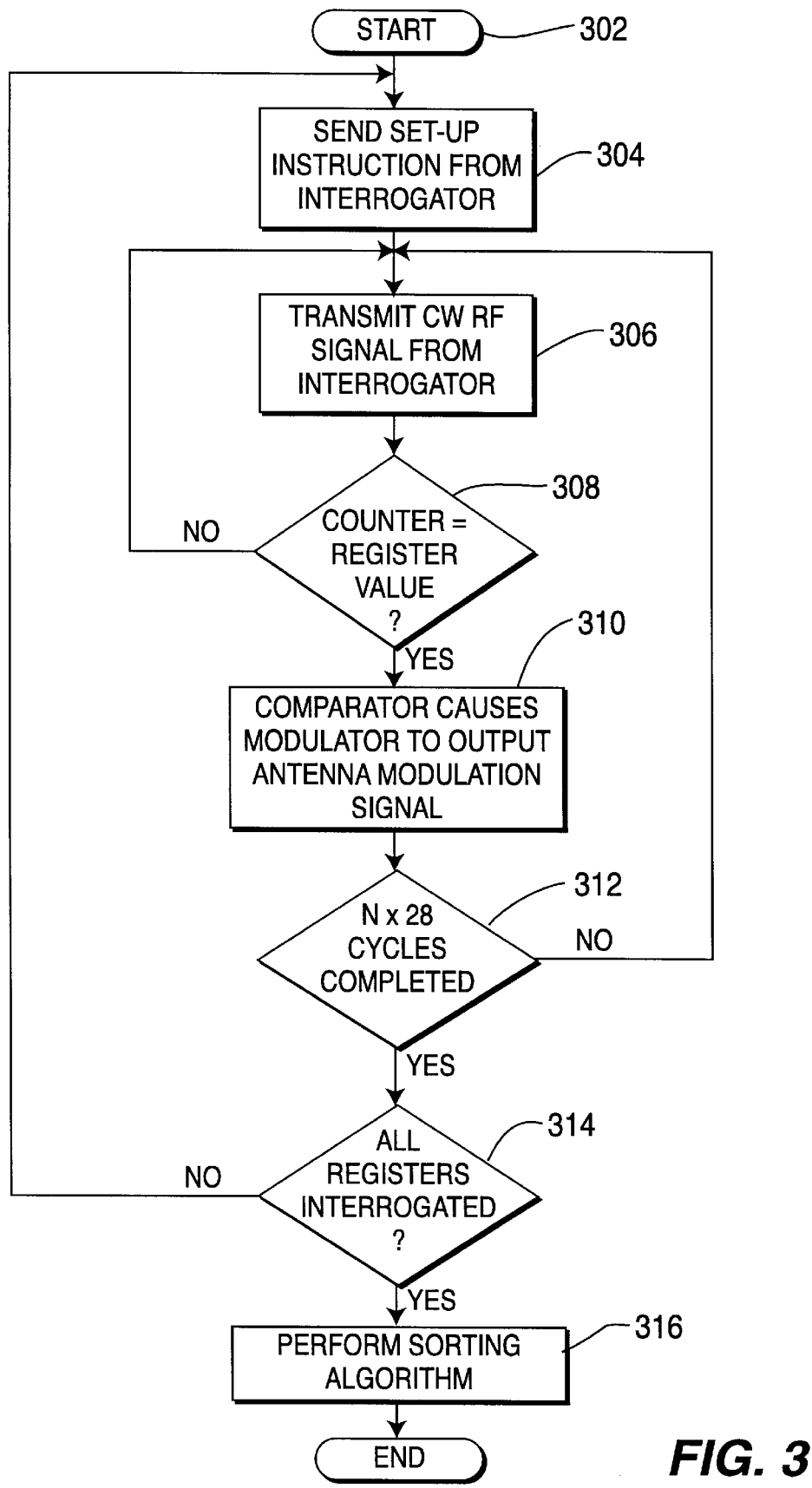
FIG. 3 is a flow diagram of a process of identifying a remotely coded article in accordance with an embodiment of the invention.

In the following example, reference is made to ID registers A, B, C and D, each of which is 8-bits wide. It should be understood, however, that the invention can use any number of registers or register widths. Referring now also to the flow diagram of FIG. 3 and the timing diagram of FIG. 4, the operation of the invention begins at step 302 and proceeds to step 304 wherein a set-up instruction is sent from the interrogator 102 which, when decoded by the instruction decoder 212, sets up the comparator 218 to compare the value of the counter 216 to the contents of the A register in ID registers 220. This set up instruction also resets counter 216 to zero. Immediately after transmitting the setup instruction, an unmodulated rf signal (known as a carrier wave (CW) signal) is transmitted by the interrogator 102 (step 306). This CW signal is converted by squarer 202 and demodulator 204 into a square wave version of input signal $F_0$ (i.e., signal $F_0'$). The divider 214 divides the square wave signal $F_0'$ by N and, as such, the counter 216 begins to count each Nth cycle. Simultaneously, a divider 501 and counter 502 in the interrogator 102 (see FIG. 5) also counts each Nth cycle of the transmitted CW signal. Since the counter 216 is counting based on the signal transmitted by the interrogator, counters 216 and 502 are synchronized. As such, the transceiver badge counter generates a count value and the interrogator generates a count value "copy" that is identical to the count value generated by the transceiver badge.

Figure 4:
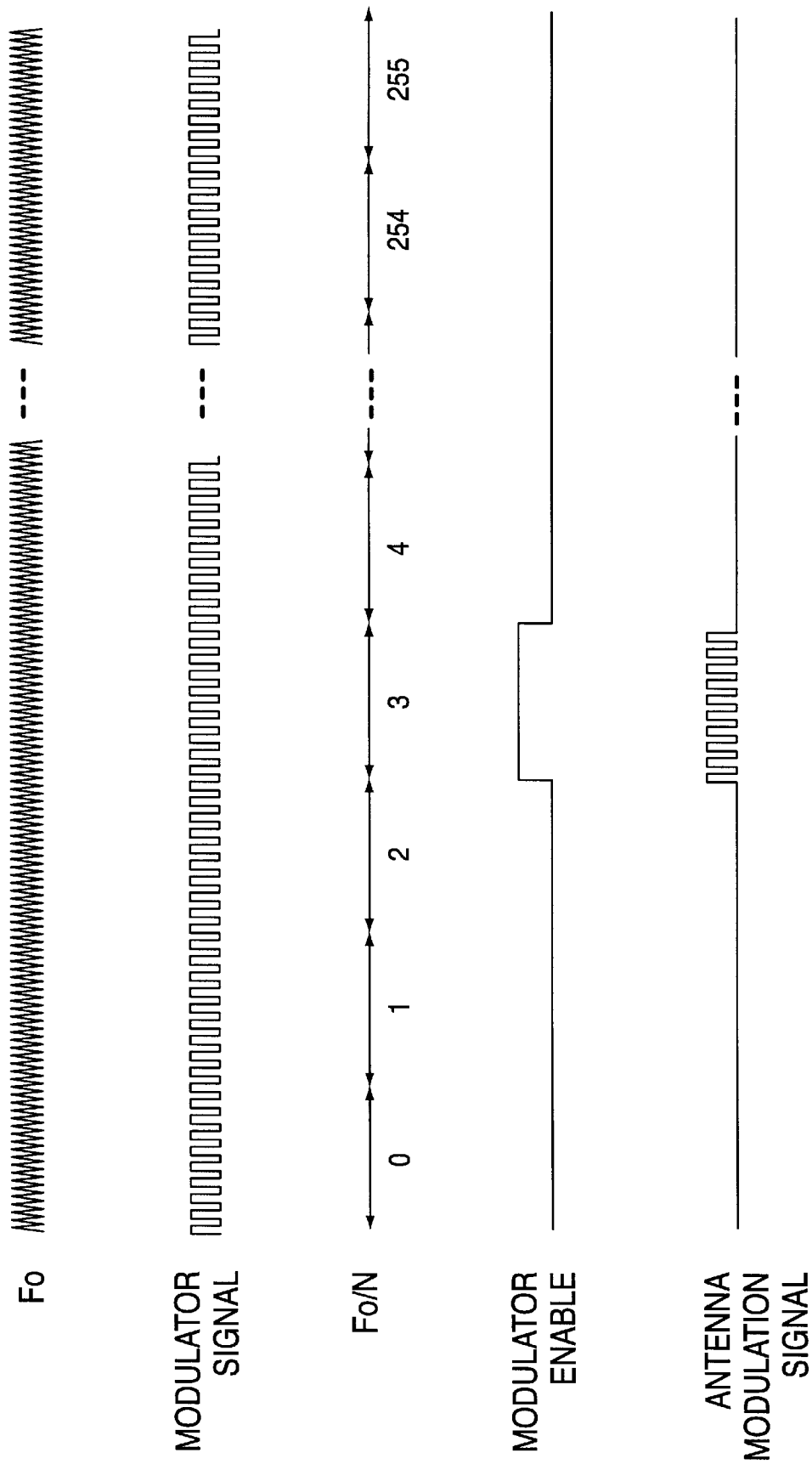
FIG. 4 is a waveform and timing diagram for the transceiver badge.

When, at step 308, the value in the counter 216 equals the value in register A, the comparator 218 produces a signal (modulator enable) to the modulator 210. The modulator 210 applies a signal to the antenna 200 (antenna modulation signal) for the duration of the Nth time interval (step 310). This signal applied to antenna 200 can be related to $F_0'$, such as by being some multiple of $F_0'$ or a quotient in which $F_0'$ is a dividend. However, if two or more tags have identical values in like registers, each will be transmitting this identical signal at substantially identical times. Whereas the signal transmitted by the two or more tags could be different in phase by 180° with respect to each other, cancellation of the signals could occur. Preferably, therefore, the signal is generated by some other means known to those having skill in the art, such as by including separate oscillators in each badge. In another embodiment, individual tags could transmit at random times during the duration of an Nth time interval. The antenna modulation signal applied to the antenna 200 is transmitted to and detected by detector 503 of interrogator 102. When the interrogator 102 detects the modulated signal, its counter indicates the value contained in the A register of ID registers 220. For example, the timing diagram of FIG. 4 depicts the modulator enable signal occurring on a count of three, as such the A register contains the value of three.

At step 312, the interrogator continues transmitting a CW signal until N×256 cycles have been transmitted ($256=2^8=$ the number of values that can be represented in an eight-bit register). If there are multiple badges 104 in the field of operation, the interrogator 102 may receive multiple responses during this period. As noted above, if multiple badges 104 have the same value in their A register, they will activate their modulators 210 simultaneously. The interrogator 102 need not distinguish between one or multiple badges 104 simultaneously. At this point the interrogator 102 only needs to determine that some badge 104 responded at a particular time corresponding to a particular A-register value.

At step 314, the interrogator 102 determines whether all the registers have been interrogated. If not, steps 304 through 312 are repeated, except that the instruction transmitted in step 304 is now changed such that the comparator 218 in the badge 104 is set up to compare the counter 216 output to the contents of the B-register. Similarly, steps 304 through 312 are repeated for the C- and D-registers, i.e., until the condition at step 314 is true.

After this scan sequence has been performed for all the ID registers 220, the interrogator 102 contains a list of the possible register contents for each register and for all badges 104 located within the field of operation, i.e., the interrogation area. However, if multiple badges 104 are present, the interrogator 102 does not know which set of register values all belong to a particular badge 104. In order to determine which set of values belong to each badge 104 within the operating field, a sorting routine is performed at step 316. This part of the process is identical to the "second pass" portion of the identification routine described in the prior U.S. Pat. No. 5,502,445.

The time required to "scan" each ID register 220 is the time required to transmit a scan instruction, T', plus the time required for the badge to respond, $T_r$. For 8-bit wide registers, the response time $T_r = 256(N)(1/f)$, where f is the frequency in Hertz of the CW signal. For the example discussed above, the entire pass of the ID routine is therefore performed in approximately $4(T_t + T_r)$ seconds. The product $(N)(1/f)$ is actually the bit period, $P_r$, for receiving data from the badge. Assuming the commands have a length of 8-bits, the time to transmit the scan command from the interrogator 102 to the badge 104 is approximately $(8)(P_t)$, where $P_t$ is the bit period for transmission of data to the badge 104. For the four registers, the entire scan time is therefore $(1024)(P_r) + (32)(P_t)$. The actual time will be somewhat longer due to sync bits and gaps between commands.

Depending on the transmit and receive bit rates of the system, this could significantly reduce the time required to perform a first scan routine as compared to the process disclosed in U.S. Pat. No. 5,502,445. In that method, for each possible register value, and for each register, a multi-byte command sequence is transmitted from the interrogator 102 to the badge 104, and most of these commands require time for a response from the badge 104. For the example given here using four 8-bit registers, the interrogator 102 would have to send the following command sequence 255 times:

Data byte follows
Data byte (0–255)
Any Yes:
  Match A?
  Match B?
  Match C?
  Match D?

For the case where one badge is present, having four different values in its registers, the prior art method requires a minimum of 784 commands must be transmitted to the badge. Of these, 272 commands (those with a "?") must wait for a response from the badge. Assuming 8-bit commands, a transmission bit period of $P_t$, and a single bit response time of $P_r$, the time required is $6272(P_t) + 272(P_r)$. For comparable bit rates, this prior art approach requires considerably more time than the technique described above, i.e., the prior art scan time of $6272(P_t) + 272(P_r)$ compared to the scan time of the invention of $32(P_t) + |1024|(P_r)$.

Although various embodiments which incorporate the teachings of the present invention have been shown and described in detail herein, those skilled in the art can readily devise many other varied embodiments that still incorporate these teachings.

What is claimed is:

1. Apparatus for transmitting a signal in response to an interrogation signal comprising:
   a demodulator for demodulating said interrogation signal;
   a signal processor, coupled to said demodulator, for interpreting a set up instruction contained in said interrogation signal and for initiating a counter to count cycles of a carrier wave signal contained in said interrogation signal; and
   a modulator, coupled to said signal processor, for transmitting a pulse during a time interval when said signal processor indicates that said counter has attained a count value that matches a codeword stored in said signal processor.

2. The apparatus of claim 1 wherein said signal processor comprises:
   an instruction decoder, coupled to said demodulator, for interpreting said set up instruction;
   a first frequency divider for dividing the frequency of the carrier wave signal by an integer value N to produce a first divided signal;
   a counter, coupled to said frequency divider, for counting cycles of said first divided signal to produce a count value;
   a code storage device for storing at least one codeword; and
   a comparator, coupled to said code storage device and said counter, for comparing the count value to a selected codeword and producing a modulator enabling signal whenever said count value matches said selected codeword.

3. The apparatus of claim 2 further comprising:
   means for providing a modulator signal, wherein said modulator transmits said modulator signal as an antenna modulation signal when said modulator is enabled by said modulator enabling signal.

4. A system for identifying electronically coded articles, comprising:
   an interrogator for transmitting an interrogation signal containing a set up instruction and a carrier wave signal;
   a computer, coupled to the interrogator, for processing responsive signals to said interrogation signal; and
   an electronically coded article for responding to said interrogation signal comprising:
      a demodulator for demodulating said interrogation signal;
      a signal processor, coupled to said demodulator, for interpreting a set up instruction contained in said interrogation signal and for initiating a counter to count cycles of the carrier wave signal contained in said interrogation signal; and a modulator, coupled to said signal processor, for transmitting a pulse during a time interval when said signal processor indicates that said counter has attained a count value that matches a codeword stored in said signal processor.

5. The system of claim 4 wherein said signal processor comprises:

an instruction decoder, coupled to said demodulator, for interpreting said set up instruction;

a first frequency divider for dividing the frequency of the carrier wave signal by an integer value N to produce a first divided signal;

a counter, coupled to said frequency divider, for counting cycles of said first divided signal to produce a count value;

a code storage device for storing at least one codeword; and a comparator, coupled to said code storage device and said counter, for comparing the count value to a selected codeword and producing a modulator enabling signal whenever said count value matches said selected codeword.

6. The system of claim 5 further comprising:

means for providing a modulator signal, wherein said modulator transmits said modulator signal as an antenna modulation signal when said modulator is enabled by said modulator enabling signal.

7. A method of responding to an interrogation signal within an electronically coded article comprising the steps of:

receiving said interrogation signal containing a set up instruction followed by a carrier wave signal;

dividing the frequency of the carrier wave signal by an integer value N to produce a first divided signal;

counting cycles in said first divided signal to produce a count value;

comparing the count value to a codeword;

producing a modulator enabling signal when said codeword matches said count value; and transmitting a pulse when said modulator enabling signal occurs.

8. The method of claim 7 wherein said comparing step further comprises:

comparing said count value to a plurality of codewords, where said modulator enabling signal is produced when the count value matches any of the codewords in said plurality of codewords.

9. A method of interrogating an electronically coded article comprising the steps of:

transmitting an interrogation signal from an interrogator, where the interrogation signal contains a set up instruction followed by a carrier wave signal;

receiving said interrogation signal within said electronically coded article;

dividing the frequency of the carrier wave signal by an integer value N to produce a first divided signal;

counting cycles in said first divided signal to produce a count value;

comparing the count value to a codeword;

producing a modulator enabling signal when said codeword matches said count value; and transmitting a pulse when said modulator enabling signal occurs.

10. The method of claim 9 wherein said comparing step further comprises:

comparing said count value to a selected one of a plurality of codewords, where said method is repeated for each of the codewords in said plurality of codewords and said modulator enabling signal is produced when the count value matches any of the codewords in said plurality of codewords.

11. The method of claim 10 further comprising the steps of:

dividing, within said interrogator, the frequency of the carrier wave signal by an integer value N to produce a first divided signal copy;

counting cycles in said first divided signal copy to produce a interrogator count value; and storing the interrogator count value when the interrogator receives said transmitted pulse for each of said plurality of codewords.

12. The method of claim 9 further comprising the steps of:

dividing, within said interrogator, the frequency of the carrier wave signal by an integer value N to produce a first divided signal copy;

counting cycles in said first divided signal copy to produce a interrogator count value; and storing the interrogator count value when the interrogator receives said transmitted pulse.

13. The method of claim 9 further comprising the steps of:

dividing the frequency of the carrier wave signal by an integer value M to produce a second divided signal; and modulating said pulse to transmit said second divided signal.

* * * * *